US010545564B2

(12) United States Patent
Qiu et al.

(10) Patent No.: US 10,545,564 B2
(45) Date of Patent: Jan. 28, 2020

(54) DISCHARGE CIRCUIT INTEGRATED IN CHIP OF SLAVE DEVICE TO FOLLOW BUS RECTIFIER BRIDGE

(71) Applicant: WUXI CHINA RESOURCES SEMICO CO., LTD, Wuxi (CN)

(72) Inventors: Minwei Qiu, Wuxi (CN); Tianshun Zhang, Wuxi (CN); Xiancai Luo, Wuxi (CN); Lei Wang, Wuxi (CN); Jieqiong Zeng, Wuxi (CN); Yujie Zhou, Wuxi (CN)

(73) Assignee: Wuxi China Resources Semico Co., Ltd., Wuxi (CN)

( * ) Notice: Subject to any disclaimer, the term of this patent is extended or adjusted under 35 U.S.C. 154(b) by 0 days.

(21) Appl. No.: 16/337,483

(22) PCT Filed: Dec. 28, 2017

(86) PCT No.: PCT/CN2017/119224
§ 371 (c)(1),
(2) Date: Mar. 28, 2019

(87) PCT Pub. No.: WO2018/121641
PCT Pub. Date: Jul. 5, 2018

(65) Prior Publication Data
US 2019/0346906 A1  Nov. 14, 2019

(30) Foreign Application Priority Data
Dec. 29, 2016 (CN) .......................... 2016 1 1251472

(51) Int. Cl.
*G06F 1/3234* (2019.01)
*G06F 13/20* (2006.01)
(52) U.S. Cl.
CPC ............ *G06F 1/3253* (2013.01); *G06F 13/20* (2013.01)

(58) Field of Classification Search
None
See application file for complete search history.

(56) References Cited

U.S. PATENT DOCUMENTS 4,441,033 A * 4/1984 Maier ...................... H03K 3/57
307/107
5,642,033 A * 6/1997 Bartol ..................... G05F 1/569
322/25

(Continued)

FOREIGN PATENT DOCUMENTS

CN  106528481 A  3/2017
CN  206339972 U  7/2017

OTHER PUBLICATIONS

International Search Report dated Mar. 23, 2018 for International Application No. PCT/CN2017/119224 filed Dec. 28, 2017.

*Primary Examiner* — Michael Sun
(74) *Attorney, Agent, or Firm* — Blue Filament Law PLLC

(57) ABSTRACT

A discharge circuit integrated in a chip of a slave device to follow a bus rectifier bridge includes: a digital control module for generating, when an output result of a comparator is that a bus voltage falls, a high-level and time-configurable pulse width to drive a discharge circuit to discharge a bus; a discharge current source module for enabling the discharge of the bus by means of a digital control module and adjusting a discharge current; a comparator for obtaining a status of a change in the bus voltage; and a peripheral circuit for monitoring the change in the bus voltage, providing to the comparator a voltage signal which reflects divided bus voltage fall information, and generating a comparison reference voltage.

5 Claims, 6 Drawing Sheets

(56) References Cited

U.S. PATENT DOCUMENTS

| | | | |
|---|---|---|---|
| 7,095,220 B2 * | 8/2006 | Kernahan | H02M 3/157 |
| | | | 323/300 |
| 2004/0095081 A1 * | 5/2004 | Kernahan | H05B 41/2827 |
| | | | 315/307 |
| 2008/0205104 A1 * | 8/2008 | Lev | H05B 37/0263 |
| | | | 363/98 |
| 2012/0146593 A1 * | 6/2012 | Akita | H02P 9/305 |
| | | | 322/10 |

* cited by examiner

DISCHARGE CIRCUIT INTEGRATED IN CHIP OF SLAVE DEVICE TO FOLLOW BUS RECTIFIER BRIDGE

CROSS-REFERENCE TO RELATED APPLICATIONS

The present application claims priority to Chinese Patent Application No. 201611251472.X, filed on Dec. 29, 2016, the content of which is incorporated herein by reference in its entirety.

TECHNICAL FIELD

The present disclosure relates to the field of communication technologies, and in particular, to the field of bus-powered communication technologies, and specifically to a discharge circuit integrated in a chip of a slave device to follow a bus rectifier bridge.

BACKGROUND

In a bus-powered communication system, polarity communication is traditionally used. The structure of such communication mode is shown in FIG. 1. The polarity scheme needs to use a marked twisted pair as signal lines for connecting while preventing connection errors. That is to say, the polarity of the signal lines BUS_C and GND_C in FIG. 1 must be fixed. This mode has the following disadvantages that it is easy to reverse the signal lines during line wiring such that it is impossible for the signal to transmit normally. In addition, there are many inconveniences in polarity connection during line inspection and correction process. Based on the above reasons, bus communication systems now begin to use non-polarity connections.

As shown in FIG. 2, a scheme for implementing a bus non-polarity connection by using a rectifier bridge circuit is shown. The rectifier bridge is composed of four diodes D1, D2, D3 and D4. BUS_C and GND_C are two port bus signals output by a master device, while BUS and GND are bus signals following a rectifier bridge. The unidirectional conduction characteristic of a diode can ensure that polarities of BUS and GND following the rectifier bridge are fixed when positive and negative polarities of BUS_C and GND_C change.

Due to the unidirectional conduction characteristics of diodes in the rectifier bridge, when the master device sends an instruction by a bus voltage fall, there is no effective discharge path in a circuit following the rectifier bridge. So, the signal BUS may have problems in signal integrity. As shown in FIG. 3, when the master device sends an instruction, the bus voltage will fall from 24V to 5V, but there is no effective discharge path, and the bus voltage following the rectifier bridge may only fall to about 12V, and the signal quality is poor. At this time, it is impossible for the slave device to accurately monitor the instruction sent on the bus, thereby causing the system to work abnormally.

The related art improves the above problems existing in non-polarity connections mainly by adding a series resistor to the bus so as to form a discharge path. However, this technology has the disadvantages of large power consumption, unsatisfactory discharge effect, and affecting bus communication performance.

The present disclosure proposes a bus discharge circuit integrated inside the chip. The discharge path is triggered only when the bus voltage falling edge is detected by the circuit, and the discharge time, discharge current and discharge trigger condition can be configured, which effectively reduces the system power consumption and increases flexibility of functions. At the same time, the discharge circuit and a circuit module sensitive to noise are independent from each other, thereby not affecting normal operation of the system. Thus, the problem of poor adaptability existing in traditional technologies is avoided, and the flexibility of functions can be enhanced, such that it can be applied to more bus communication systems.

The related art mainly improves the quality of the transmitted signal mainly by adding a discharge path to a signal line following the rectifier bridge with a series resistor. The implementation manner is shown in FIG. 4. The circuit generates a path between the bus voltage following the rectifier bridge and a power supply VDD of the slave device function module by using a resistor Rx. When the bus voltage falls, the bus can discharge to VDD through Rx. This can avoid the problem that the bus voltage level cannot be matched with the communication protocol during communication, which would otherwise result in that the system operates abnormally.

In summary, the related art includes the following three major problems:

First, in order to obtain suitable discharge performance, the discharge resistor Rx needs to be designed and adjusted to obtain a sufficiently large discharge current. However, this path will always be open and the current is relatively large, which will greatly increase the power consumption of the system.

Second, signal noise existing in the bus will be coupled to VDD through the resistor Rx, such that VDD will become an unclean power supply. This will affect the performance of the signal processing circuit. In order to avoid this problem, it is necessary to add a filter circuit to VDD, which will increase the complexity of the power system and reduce the reliability of the system, and to this end, design cost will be increased.

Third, parameters such as the discharge current and discharge time of the circuit are fixed and cannot adapt to the requirements of different bus communication methods, and the application range is relatively narrow.

SUMMARY

An object of the present disclosure is to overcome the above disadvantages of the related art by providing a discharge circuit integrated in a chip of a slave device to follow a bus rectifier bridge, which can be directly integrated inside the chip of the slave device and reduce power consumption of a discharge module, without affecting the normal operation performance of a signal processing circuit and with configurable discharge parameters.

In order to achieve the above object, the discharge circuit integrated in a chip of a slave device to follow a bus rectifier bridge has the following structure.

The main feature of the discharge circuit integrated in a chip of a slave device to follow a bus rectifier bridge is that it mainly includes:

a slave device voltage stabilizing module configured to maintain stability of an internal voltage of the slave device;

a slave device signal processing module configured to process a signal of the slave device;

a slave device bus communication module configured to implement bus communication of the slave device;

a digital control module configured to generate, when an output result of a comparator is that a bus voltage falls, a high-level and time-configurable pulse width to drive the discharge circuit to discharge a bus, a discharge current source module configured to enable the discharge of the bus by means of a digital control module, and adjust a discharge current;

a comparator configured to obtain a status of a change in the bus voltage; and a peripheral circuit configured to monitor the change in the bus voltage, provide to the comparator a voltage signal which reflects information on a fall of the bus voltage, and generate a comparison reference voltage.

The slave device voltage stabilizing module, the slave device signal processing module, the slave device bus communication module, the digital control module, the discharge current source module, the comparator and the peripheral circuit are connected to each other.

The discharge circuit integrated in a chip of a slave device to follow a bus rectifier bridge of the present disclosure is only turned on when a bus communication falling edge is monitored, and thus the power consumption overheads of an overall system would not be additionally increased. A bus discharge circuit and a slave device signal processing circuit are independent from each other, and thus noise of a bus would not be coupled to a circuit sensitive to noise, such that operation performance of the slave device will not be affected. Each parameter of the discharge circuit can be configured so as to satisfy electrical property requirements of different systems and thus improving the adaptability of a product. Therefore, it has a wide range of applications.

DESCRIPTION OF EMBODIMENTS

Figure 1:
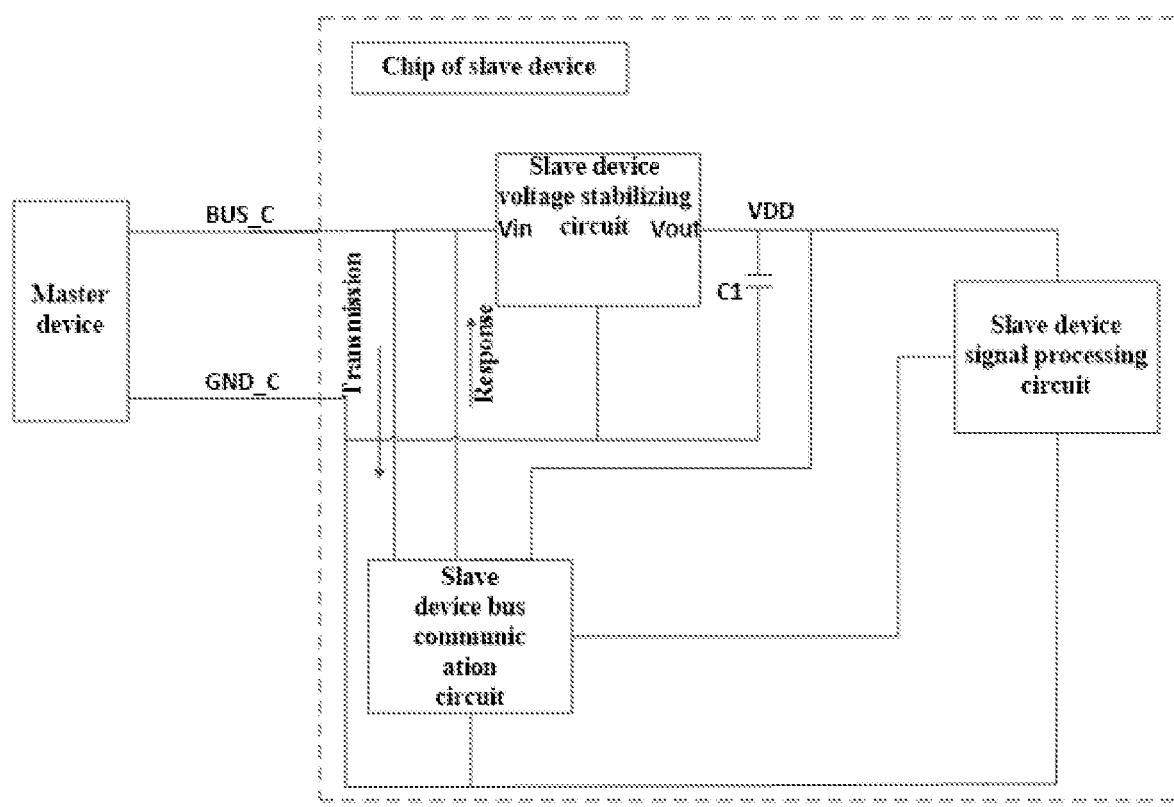
FIG. 1 is a schematic diagram of a polar bus communication system according to the related art.
Figure 2:
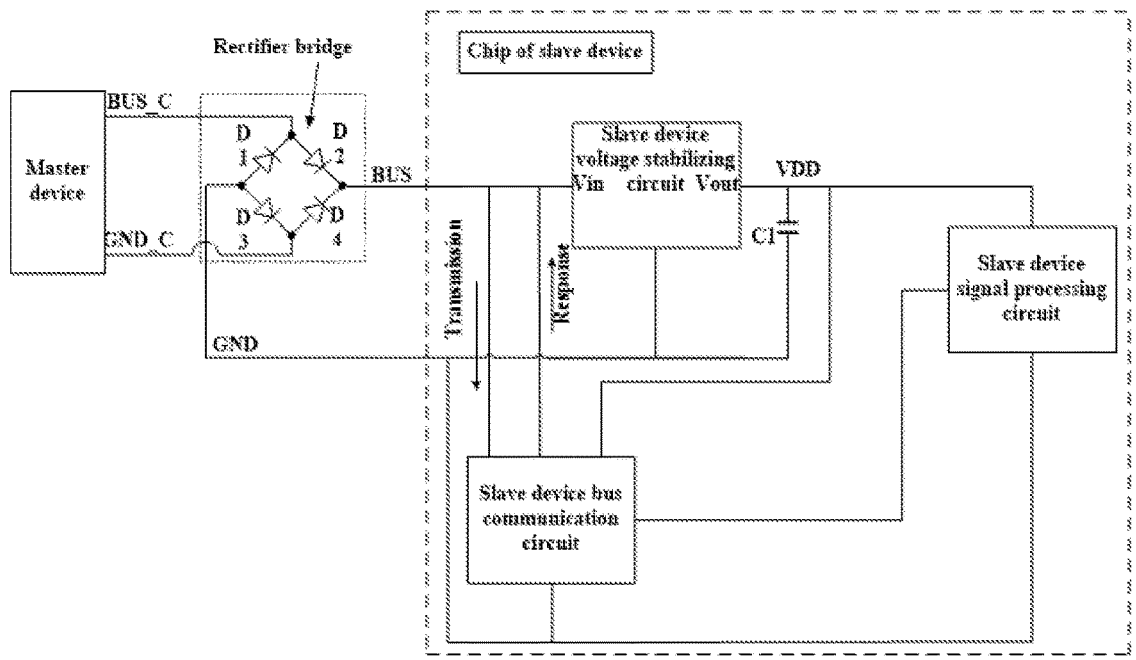
FIG. 2 is a schematic diagram of a non-polar bus communication system according to the related art.

In order to more clearly describe the technical content of the present disclosure, further description will be made below in conjunction with specific embodiments.

The discharge circuit integrated in a chip of a slave device to follow a bus rectifier bridge of the present disclosure includes:

a slave device voltage stabilizing module configured to maintain stability of an internal voltage of the slave device;

a slave device signal processing module configured to process a signal of the slave device;

a slave device bus communication module configured to implement bus communication of the slave device;

a digital control module configured to generate, when an output result of a comparator is that a bus voltage falls, a high-level and time-configurable pulse width to drive the discharge circuit to discharge a bus, a discharge current source module configured to enable the discharge of the bus by means of a digital control module, and adjust a discharge current;

a comparator configured to obtain a status of a change in the bus voltage; and a peripheral circuit configured to monitor the change in the bus voltage, provide to the comparator a voltage signal which reflects information on a divided voltage of the bus, and generate a comparison reference voltage.

The slave device voltage stabilizing module, the slave device signal processing module, the slave device bus communication module, the digital control module, the discharge current source module, the comparator and the peripheral circuit are connected to each other.

In a preferred embodiment of the present disclosure, the peripheral circuit includes a first capacitor, a first resistor, a second resistor, a third resistor, a fourth resistor and a BUS terminal and a GND terminal of the chip of the slave device, a first terminal of the slave device voltage stabilizing module is respectively connected to a first terminal of the slave device bus communication module, a second terminal of the slave device bus communication module, a first terminal of the first resistor, the BUS terminal and a first terminal of the discharge current source module, a second terminal of the slave device voltage stabilizing module is respectively connected to a first terminal of the first capacitor, a first terminal of the slave device signal processing module and a first terminal of the third resistor, a third terminal of the slave device voltage stabilizing module is respectively connected to a second terminal of the first capacitor, the second terminal of the slave device signal processing module, a fourth terminal of the slave device bus communication module, the GND terminal, a second terminal of the second resistor, a second terminal of the fourth resistor, a fifth terminal of the digital control module and a fifth terminal of the discharge current source module, a third terminal of the slave device signal processing module is connected to a third terminal of the slave device bus communication module, a second terminal of the first resistor is respectively connected to a first terminal of the second resistor and a non-inverting input terminal of the comparator, a second terminal of the third resistor is respectively connected to a first terminal of the fourth resistor and an inverting input terminal of the comparator, an output terminal of the comparator is connected to a first terminal of the digital control module, a second terminal of the digital control module is connected to a second terminal of the discharge current source module, a third terminal of the digital control module is connected to a third terminal of the discharge current source module, and a fourth terminal of the digital control module is connected to a fourth terminal of the discharge current source module.

In a further preferred embodiment of the present disclosure, the third resistor is an adjustable resistor.

In a preferred embodiment of the present disclosure, the peripheral circuit includes a first capacitor, a second capacitor, a first resistor, a second resistor, a third resistor, a fourth resistor, a second comparator and a BUS terminal and a GND terminal of the chip of the slave device, a first terminal of the slave device voltage stabilizing module is respectively connected to a first terminal of the slave device bus communication module, a second terminal of the slave device bus communication module, a first terminal of the first resistor, the BUS terminal and a first terminal of the discharge current source module, a second terminal of the slave device voltage stabilizing module is respectively connected to a first terminal of the first capacitor and a first terminal of the slave device signal processing module, a third terminal of the slave device voltage stabilizing module is respectively connected to a second terminal of the first capacitor, a second terminal of the second capacitor, the second terminal of the slave device signal processing module, a fourth terminal of the slave device bus communication module, the GND terminal, a second terminal of the second resistor, a second terminal of the fourth resistor, a fifth terminal of the digital control module and a fifth terminal of the discharge current source module, a third terminal of the slave device signal processing module is connected to a third terminal of the slave device bus communication module, a second terminal of the first resistor is respectively connected to a first terminal of the second resistor, a non-inverting input terminal of the comparator and a non-inverting input terminal of the second comparator, an inverting input terminal of the second comparator is respectively connected to an output terminal of the second comparator, a first terminal of the second capacitor and a first terminal of the third resistor, a second terminal of the third resistor is respectively connected to a first terminal of the fourth resistor and the inverting input terminal of the comparator, an output terminal of the comparator is connected to a first terminal of the digital control module, a second terminal of the digital control module is connected to a second terminal of the discharge current source module, a third terminal of the digital control module is connected to a third terminal of the discharge current source module, a fourth terminal of the digital control module is connected to a fourth terminal of the discharge current source module, and the third resistor is an adjustable resistor.

In a further preferred embodiment of the present disclosure, the discharge current source module includes a first current source, a second current source, a third current source, a first key, a second key and a third key, a negative electrode of the first current source is respectively connected to a negative electrode of the second current source, a negative electrode of the third current source and a first terminal of the discharge current source module, a positive electrode of the first current source is connected to a first terminal of the first key, a second terminal of the first key is connected to a second terminal of the discharge current source module, a second terminal of the second key is connected to a third terminal of the discharge current source module, a second terminal of the third key is connected to a fourth terminal of the discharge current source module, a third terminal of the first key, a third terminal of the second key and a third terminal of the third key are connected to a fifth terminal of the discharge current source module, a positive electrode of the second current source is connected to a first terminal of the second key, and a positive electrode of the third current source is connected to a first terminal of the third key.

Figure 5:
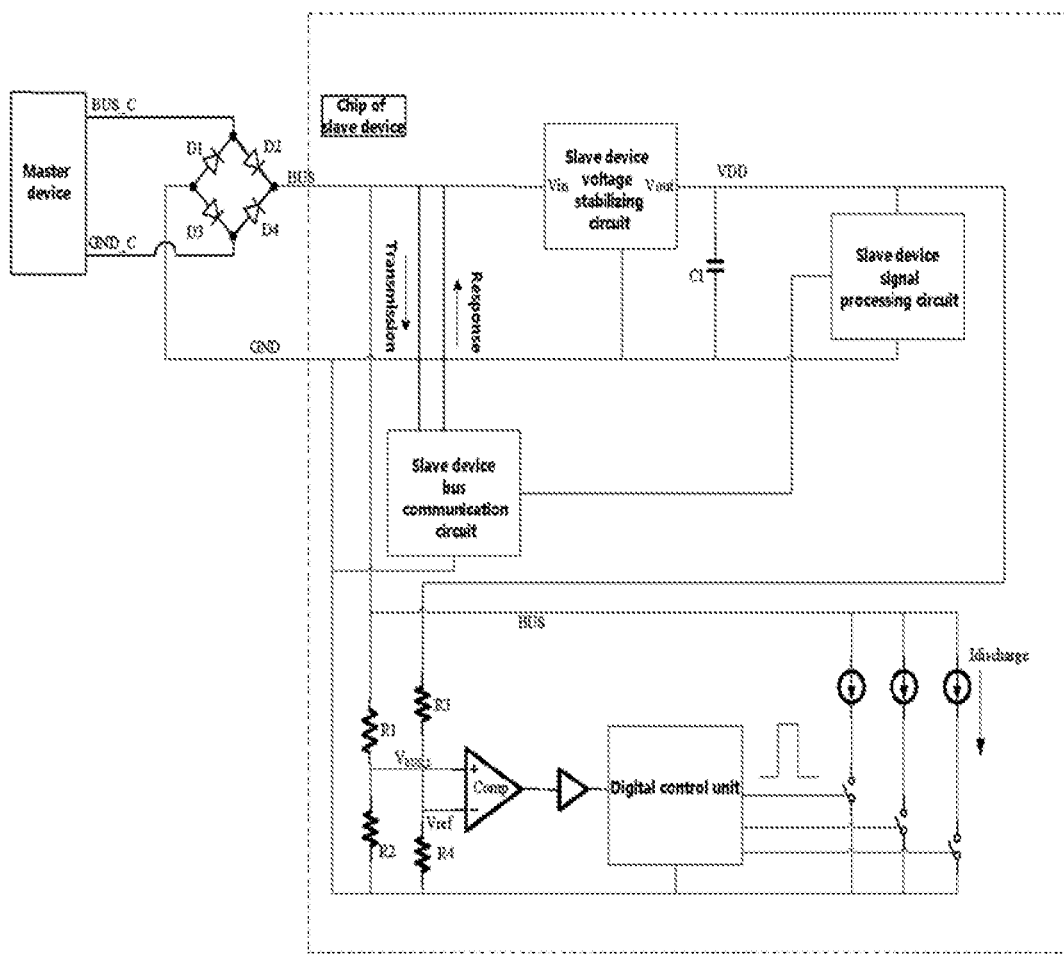
FIG. 5 is a schematic diagram showing a circuit structure of the discharge circuit integrated in a chip of a slave device to follow a bus rectifier bridge according to the present disclosure.

In a specific embodiment of the present disclosure, as shown in FIG. 5, the most important part in the discharge circuit mainly include:

firstly, resistors R1 and R2 for monitoring a change in the bus voltage, obtaining a level VBUS_L reflecting the divided bus voltage fall information and providing it to the comparator; and resistors R3 and R4 for performing voltage division on an output VDD of the voltage stabilizing circuit to obtain a fixed reference Vref as a comparison reference;

secondly, a comparator for comparing VBUS_L and Vref, the comparison result will show the change in the bus voltage;

thirdly, a digital control module configured to generate, when an output result of the comparator determines that it is be bus voltage fall, a high-level and time-configurable pulse width to drive the discharge circuit to discharge a bus; and fourthly, a discharge current source module configured to enable the discharge of the bus by means of a digital control module and adjust a discharge current.

Figure 4:
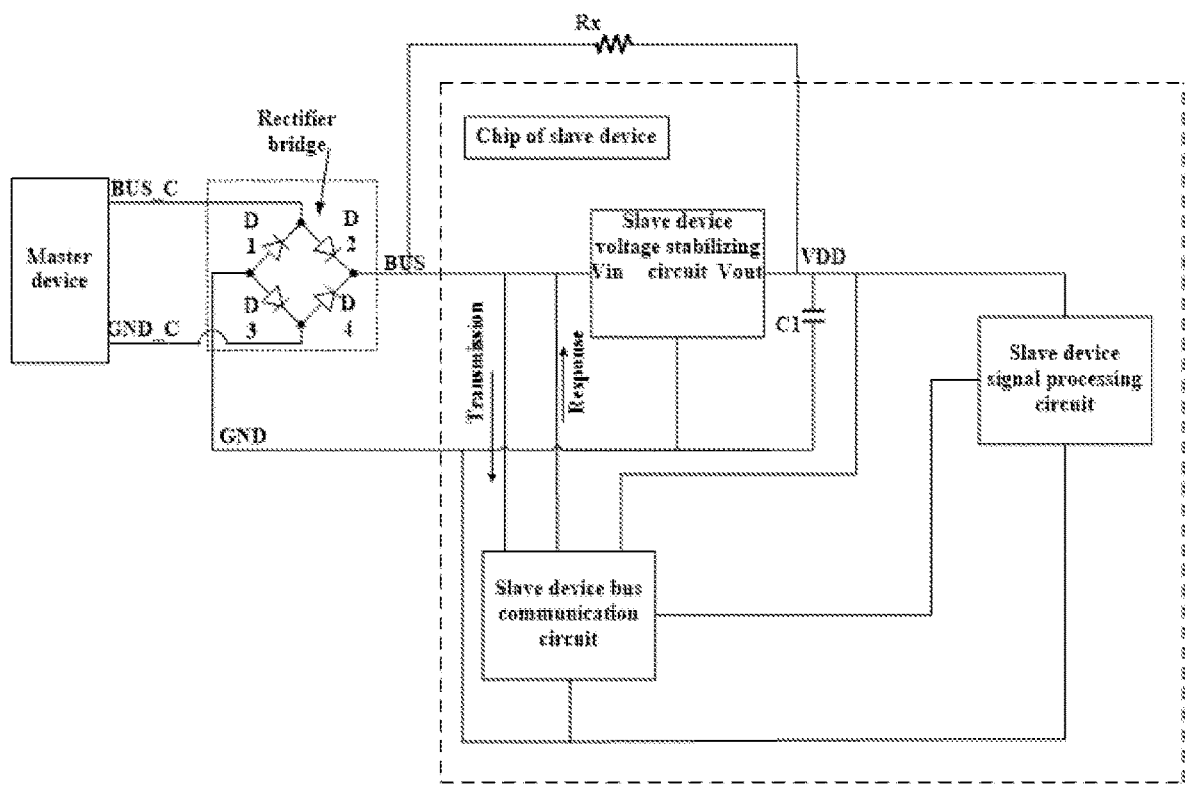
FIG. 4 is a schematic diagram of an embodiment of the related art.

This scheme has the following improvements compared to the related art shown in FIG. 4. The discharge circuit is turned on only during communication such that power consumption is reduced. The non-polarity discharge circuit is isolated from the signal processing circuit, thereby reducing the influence of bus noise. The discharge time and the discharge current are configurable, so that for different communication protocols, the circuit discharge can be effectively achieved by configuring parameters, which avoids the problem of unsatisfactory discharge effect in related art and improves flexibility of a product.

In another specific embodiment of the present disclosure, due to a large difference in bus communication system protocols, the bus voltage falls from 24V to 0V or 5V or other voltage values when the bus sends an instruction. In order to adapt to a variety of communication protocols, the reference voltage Vref requires a programmable configuration. Therefore, the resistor R3 in the scheme shown in FIG. 5 is changed into an adjustable resistor, and a value of Vref is selected according to different communication protocols, which further improves the adaptability of the circuit. The overall scheme is shown in FIG. 6.

Figure 3:
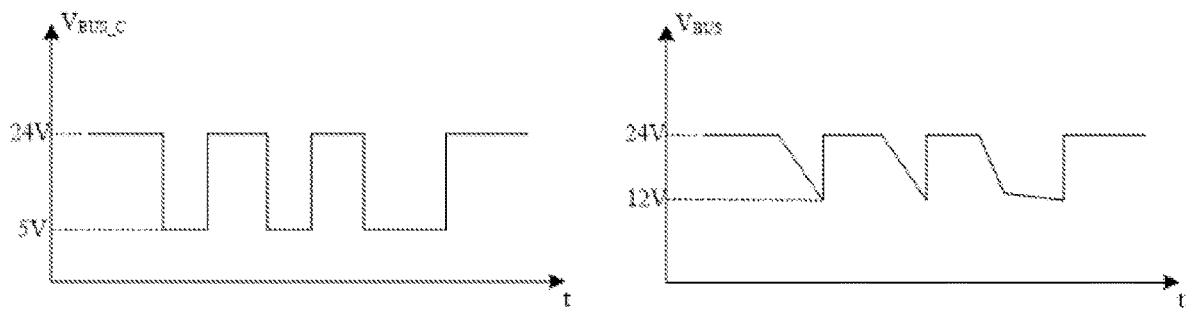
FIG. 3 is a schematic diagram showing a comparison of bus waveforms before and after a rectifier bridge without using a discharge technique.
Figure 6:
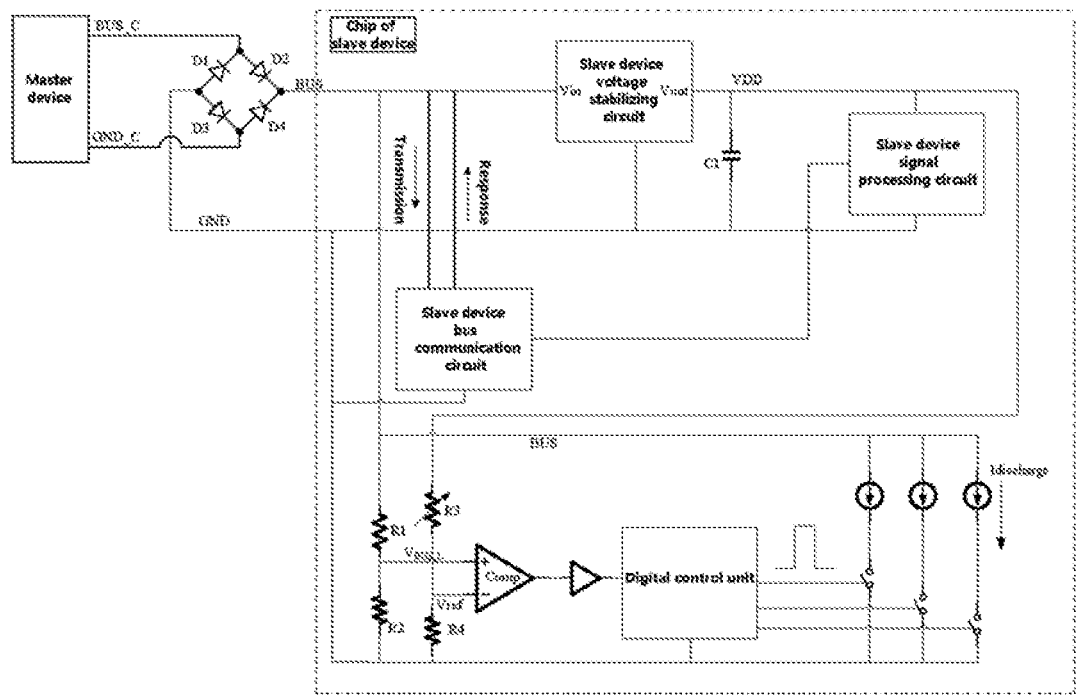
FIG. 6 is a schematic diagram of an embodiment of the discharge circuit integrated in a chip of a slave device to follow a bus rectifier bridge according to the present disclosure.
Figure 7:
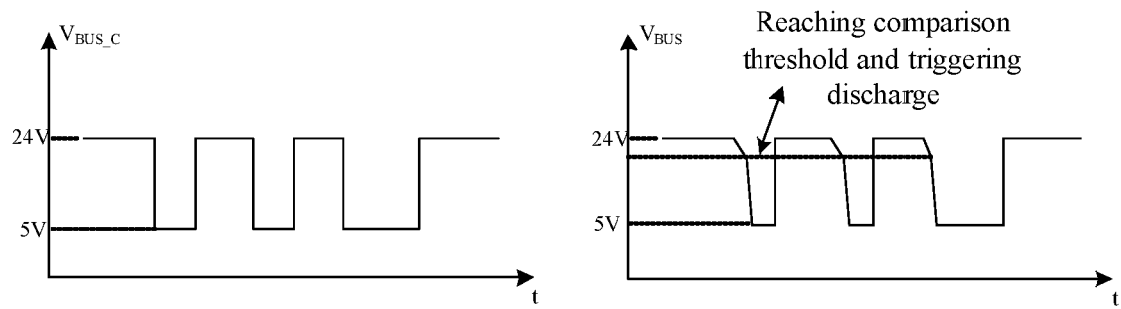
FIG. 7 is a schematic diagram showing a comparison of bus waveforms before and after a rectifier bridge in the discharge circuit integrated in a chip of a slave device to follow a bus rectifier bridge according to the present disclosure.

As shown in FIG. 7, bus waveforms during communication under the same communication protocol using the scheme shown in FIG. 6 are greatly improved compared with the waveform after the rectifier bridge shown in FIG. 3, such that the system can communicate normally.

Figure 8:
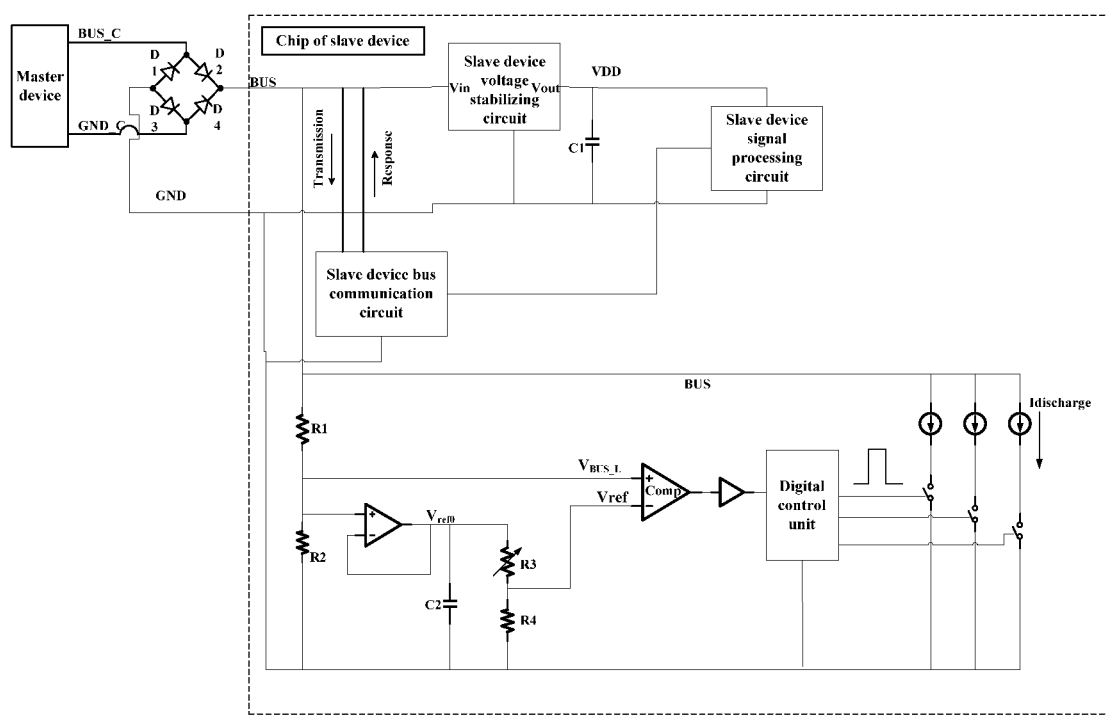
FIG. 8 is a schematic diagram of another embodiment of the discharge circuit integrated in a chip of a slave device to follow a bus rectifier bridge according to the present disclosure.

In another specific embodiment of the present disclosure, as shown in FIG. 8, the reference comparison voltage Vref is generated by voltage division of the bus. Due to the action of an operational amplifier and a capacitor C2, Vref0 can keep stable for a period of time during bus communication. When the bus is not communicating, there is:

$$V_{ref} = \frac{R_4}{R_3 + R_4} * V_{BUS\_L}$$

The reference threshold can be set to a percentage with respect to the bus voltage by setting the resistor R3. This scheme can be used in relative voltage comparison systems in which a comparison threshold is related to a bus voltage.

The discharge circuit integrated in a chip of a slave device to follow a bus rectifier bridge of the present disclosure is only activated when a bus communication falling edge is monitored, and thus the power consumption overheads of an overall system would not be additionally increased. A bus discharge circuit and a signal processing circuit of a slave device are independent from each other, and thus noise of a bus would not be coupled to a circuit sensitive to noise, such that operation performance of the slave device will not be affected. Each parameter of the discharge circuit can be configured, thus satisfying electrical property requirements of different systems and improving the adaptability of a product, and therefore, it has a wide range of applications.

In this specification, the present disclosure has been described with reference to specific embodiments thereof. However, it will be apparent that various modifications and changes can be made without departing from the scope of the present disclosure. Accordingly, the specification and drawings are to be regarded as illustrative rather than limiting.

What is claimed is:

1. A discharge circuit integrated in a chip of a slave device to follow a bus rectifier bridge, wherein the circuit comprises:
    a slave device voltage stabilizing module configured to maintain stability of an internal voltage of the slave device;
    a slave device signal processing module configured to process a signal of the slave device;
    a slave device bus communication module configured to implement bus communication of the slave device;
    a digital control module configured to generate, when an output result of a comparator is that a bus voltage falls, a high-level and time-configurable pulse width to drive the discharge circuit to discharge a bus,
    a discharge current source module configured to enable the discharge of the bus by means of a digital control module, and adjust a discharge current;
    a comparator configured to obtain a status of a change in the bus voltage; and
    a peripheral circuit configured to monitor the change in the bus voltage, provide to the comparator a voltage signal which reflects information on a fall of the bus voltage, and generate a comparison reference voltage, and
the slave device voltage stabilizing module, the slave device signal processing module, the slave device bus communication module, the digital control module, the discharge current source module, the comparator and the peripheral circuit are connected to each other.

2. The discharge circuit integrated in a chip of a slave device to follow a bus rectifier bridge according to claim 1, wherein the peripheral circuit comprises a first capacitor, a first resistor, a second resistor, a third resistor, a fourth resistor and a BUS terminal and a GND terminal of the chip of the slave device, a first terminal of the slave device voltage stabilizing module is respectively connected to a first terminal of the slave device bus communication module, a second terminal of the slave device bus communication module, a first terminal of the first resistor, the BUS terminal and a first terminal of the discharge current source module, a second terminal of the slave device voltage stabilizing module is respectively connected to a first terminal of the first capacitor, a first terminal of the slave device signal processing module and a first terminal of the third resistor, a third terminal of the slave device voltage stabilizing module is respectively connected to a second terminal of the first capacitor, the second terminal of the slave device signal processing module, a fourth terminal of the slave device bus communication module, the GND terminal, a second terminal of the second resistor, a second terminal of the fourth resistor, a fifth terminal of the digital control module and a fifth terminal of the discharge current source module, a third terminal of the slave device signal processing module is connected to a third terminal of the slave device bus communication module, a second terminal of the first resistor is respectively connected to a first terminal of the second resistor and a non-inverting input terminal of the comparator, a second terminal of the third resistor is respectively connected to a first terminal of the fourth resistor and an inverting input terminal of the comparator, an output terminal of the comparator is connected to a first terminal of the digital control module, a second terminal of the digital control module is connected to a second terminal of the discharge current source module, a third terminal of the digital control module is connected to a third terminal of the discharge current source module, and a fourth terminal of the digital control module is connected to a fourth terminal of the discharge current source module.

3. The discharge circuit integrated in a chip of a slave device to follow a bus rectifier bridge according to claim 2, wherein the third resistor is an adjustable resistor.

4. The discharge circuit integrated in a chip of a slave device to follow a bus rectifier bridge according to claim 1, wherein the peripheral circuit comprises a first capacitor, a second capacitor, a first resistor, a second resistor, a third resistor, a fourth resistor, a second comparator and a BUS terminal and a GND terminal of the chip of the slave device, a first terminal of the slave device voltage stabilizing module is respectively connected to a first terminal of the slave device signal processing module, a second terminal of the slave device signal processing module, a first terminal of the first resistor, the BUS terminal and a first terminal of the discharge current source module, a second terminal of the slave device voltage stabilizing module is respectively connected to a first terminal of the first capacitor and the first terminal of the slave device signal processing module, a third terminal of the slave device voltage stabilizing module is respectively connected to a second terminal of the first capacitor, a second terminal of the second capacitor, the second terminal of the slave device signal processing module, a fourth terminal of the slave device bus communication module, the GND terminal, a second terminal of the second resistor, a second terminal of the fourth resistor, a fifth terminal of the digital control module and a fifth terminal of the discharge current source module, a third terminal of the slave device signal processing module is connected to a third terminal of the slave device bus communication module, a second terminal of the first resistor is respectively connected to a first terminal of the second resistor, a non-inverting input terminal of the comparator and a non-inverting input terminal of the second comparator, an inverting input terminal of the second comparator is respectively connected to an output terminal of the second comparator, a first terminal of the second capacitor and a first terminal of the third resistor, a second terminal of the third resistor is respectively connected to a first terminal of the fourth resistor and the inverting input terminal of the comparator, an output terminal of the comparator is connected to the fifth terminal of the digital control module, a second terminal of the digital control module is connected to a second terminal of the discharge current source module, a third terminal of the digital control module is connected to a third terminal of the discharge current source module, a fourth terminal of the digital control module is connected to a fourth terminal of the discharge current source module, and the third resistor is an adjustable resistor.

5. The discharge circuit integrated in a chip of a slave device to follow a bus rectifier bridge according to claim 1, wherein the discharge current source module comprises a first current source, a second current source, a third current source, a first key, a second key and a third key, a negative electrode of the first current source is respectively connected to a negative electrode of the second current source, a negative electrode of the third current source and a first terminal of the discharge current source module, a positive electrode of the first current source is connected to a first terminal of the first key, a second terminal of the first key is connected to a second terminal of the discharge current source module, a second terminal of the second key is connected to a third terminal of the discharge current source module, a second terminal of the third key is connected to a fourth terminal of the discharge current source module, a third terminal of the first key, a third terminal of the second key and a third terminal of the third key are connected to a fifth terminal of the discharge current source module, a positive electrode of the second current source is connected to a first terminal of the second key, and a positive electrode of the third current source is connected to a first terminal of the third key.

* * * * *